United States Patent [19]

Binder et al.

[11] Patent Number: 4,842,967
[45] Date of Patent: Jun. 27, 1989

[54] ALKALINE EARTH-OXYHALIDE ELECTROCHEMICAL CELL FOR LOW TEMPERATURE USE

[75] Inventors: Michael Binder, Brooklyn, N.Y.; Charles W. Walker, Jr., Neptune, N.J.

[73] Assignee: The United States of America as represented by the Secretary of the Army, Washington, D.C.

[21] Appl. No.: 196,708

[22] Filed: May 20, 1988

[51] Int. Cl.$^4$ .................... H01M 4/36; H01M 6/14
[52] U.S. Cl. .................................. 429/101; 429/105; 429/196
[58] Field of Search ................... 429/101, 105, 196

[56] References Cited

U.S. PATENT DOCUMENTS

| | | | |
|---|---|---|---|
| 3,879,223 | 4/1975 | Farrington et al. | 429/105 X |
| 3,897,264 | 7/1975 | Auborn | 429/196 |
| 4,543,305 | 9/1985 | Binder et al. | 429/101 |
| 4,663,252 | 5/1987 | Chenebault et al. | 429/196 X |

*Primary Examiner*—Stephen J. Kalafut
*Attorney, Agent, or Firm*—Sheldon Kanars; Roy E. Gordon

[57] ABSTRACT

An alkaline earth-oxyhalide electrochemical cell is improved in its low temperatures operation by including bromine in the electrolyte of the cell.

6 Claims, No Drawings

ALKALINE EARTH-OXYHALIDE ELECTROCHEMICAL CELL FOR LOW TEMPERATURE USE

The invention described herein may be manufactured, used and licensed by or for the Government for governmental purposes without the payment to use of any royalty thereon.

This invention relates in general to an alkaline earthoxyhalide electrochemical cell and in particular, to an improved alkaline earth-oxyhalide electrochemical cell for low temperature use.

BACKGROUND OF THE INVENTION

Calcium/$Ca(AlCl_4)_2$-oxyhalide/carbon cells have been studied because of their high energy density and greater safety as compared to lithium/oxyhalide cells. However, calcium cells have had no or little useability under load at low temperature of about $-30°$ C. which has impeded the development of a marketable battery. Although cathode performance has been acceptable at low temperature, the anode has not been able to handle moderate current densities and has thus been responsible for poor performance. As one has raised the temperature of discharge, the anode behavior or load voltage has been improved, allowing for more and more cell capacity approaches ambient.

When a current load is imposed on a cell, resistance causes warming of the cell. Therefore, if one can improve load voltage at either the anode or cathode for a few minutes, the cell will begin to heat. This would be especially true for a spirally wound battery, where the local buildup of heat in the center of the cell is significant. Heating will raise the cell temperature, improve cell voltage under load, and cell capacity will thus be extended.

The general object of this invention is to improve the low temperature performance of an alkaline earth-oxyhalide electrochemical cell for at least several minutes to allow cell heating, after which the cell will sustain acceptable load voltage and capacity on its own. A more particular object of this invention is to provide ultra-safe calcium thionyl chloride cells that will perform at about $-30°$ C. A still further object of the invention is to provide such batteries that can be used in place of the lithium-sulfur dioxide batteries in current use.

It has now been found that the aforementioned objects can be attained by including bromine in the electrolyte of a calcium thionyl chloride cell to permit discharge at about $-30°$ C. at 5 $mA/cm^2$ for several minutes with a load potential above 2.0 volts. Without bromine, load potentials are below 2.0 volts within a minute after the load is imposed. The modest performance allows a fully developed spirally wound cell to build up heat internally, with the rise in temperature improving the load potential and allowing significantly more cell life or capacity.

The bromine provides the cell with sufficient initial operating potential and capacity so that the internally generated heat will subsequently allow continued cell performance even at $-30°$ C.

DESCRIPTION OF THE PREFERRED EMBODIMENT

A typical cell includes a calcium anode, 1M $Ca(AlCl_4)_2$ thionyl chloride/75 percent Shawinigan - 25 percent acetone washed Black Pearls 2000 carbon black cathode. The improvement to this cell involves the addition of 10 volume percent bromine to the electrolyte. During discharge at about $-30°$ C., cathode potential is raised by about 0.5 volt providing a cell voltage well above the 2.0 volt minimum which is a standard military specification. Without bromine, cell capacity is about one minute. With the addition of bromine, load voltage is initially 2.5 volts, then slowly decreases to 2.0 volts over about twelve minutes.

Without bromine, local cell heating will not occur for a long enough period or be sufficient enough to allow the cell to maintain a load voltage above two volts. Many equipments sense such a deficiency and will not operate under such conditions. However, with bromine added to the electrolyte, several minutes of acceptable load voltage is achieved, and cell heating should be significant during this period after which the cell will sustain itself even though the ambient is $-30°$ C.

In the foregoing embodiment, other alkali or alkaline earth metals can be used as the anode such as lithium, sodium, or magnesium, or an alloy may be used such as Ca/Ba, Ca/Sr, Ca/Li, Ca/Ag, or Ca/Sb.

The electrolyte solvent may be $SOCl_2$, $SO_2Cl_2$, or $SO_2ClBr$.

The electrolyte salt may be of any molarity below the solubility limit and may include any soluble tetrachloroaluminate salt such a $LiAlCl_4$, $Ba(AlCl_4)_2$ or ($CH_3CH_2CH_2CH_2)_4NAlCl_4$. The salt may also be of a soluble tetrachlorogallate such as $Ca(GaCl_4)_2$.

The electrolyte may also include cosolvents such as sulfur dioxide, sulfur trioxide, acetonitrile, sulfuryl chloride, or thionyl bromide.

The amount of bromine added to the electrolyte may be about 10 volume percent but is not limited to this concentration.

The cathode may include any carbon black of high or low surface area, either alone or in mixtures of carbons. Further, the cathode maybe prepared using any suitable binder and/or current collector.

In summary, the use of bromine in a calcium/thionyl chloride cell permits discharge at $-30°$ C. at 5 $mA/cm^2$ for several minutes with a load potential above 2.0 volts. Without bromine, load potentials are below 2.0 volts within a minute after the load is imposed. This performance allows a fully developed cell to heat internally, with the rise in temperature improving the load potential and subsequently allowing significantly more cell life or capacity.

We wish it to be understood that we do not desire to be limited to the exact details of construction as described for obvious modifications will occur to a person skilled in the art.

What is claimed is:

1. In an alkaline earth-oxyhalide electrochemical cell including calcium as the anode, a solution of a soluble tetrachloroaluminate salt in an oxyhalide solvent as the electrolyte, and carbon black as the cathode, the improvement of including relatively small quantities of bromine in the electrolyte to permit discharge of the cell at $-30°$ C. at 5$mA/cm^2$ for several minutes with a load potential about 2.0 volts.

2. An improved cell according to claim 1 wherein the soluble tetrachloroaluminate salt is 1M $Ca(AlCl_4)_2$ and the oxyhalide solvent is thionyl chloride.

3. An improved cell according to claim 1 wherein the carbon cathode includes three parts Shawinigan acetylene black and one part acetone washed Black Pearls 2000, containing 10 weight percent Teflon binder, supported on a nickel current collector.

4. An improved cell according to claim 1 wherein the electrolyte includes a cosolvent.

5. An improved cell according to claim 1 wherein about 10 volume percent of bromine is included in the electrolyte.

6. In an alkaline earth-oxyhalide electrochemical cell including calcium as the anode, a solution of 1M Ca(AlCl$_4$)$_2$ in thionyl chloride as the electrolyte, and three parts Shawinigan acetylene black and one part acetone washed Black Pearls 2000 containing about 10 weight percent Teflon binder supported on a nickel current collector as the cathode, the improvement of including about 10 volume percent of bromine in the electrolyte to permit discharge of the cell at $-30°$ C. at 5mA/cm$^2$ for several minutes with a load potential about 2.0 volts.

* * * * *